United States Patent [19]

Breck et al.

[11] Patent Number: 4,659,126
[45] Date of Patent: Apr. 21, 1987

[54] DUCT PULLING TOOL

[75] Inventors: Steven E. Breck, Addison; George E. Armbruster, Park Ridge, both of Ill.

[73] Assignee: Illinois Bell Telephone Company, Chicago, Ill.

[21] Appl. No.: 591,961

[22] Filed: Mar. 21, 1984

[51] Int. Cl.⁴ .............................................. B66C 1/44
[52] U.S. Cl. ................................. 294/93; 269/48.1
[58] Field of Search ............... 269/48.1; 279/2 R; 254/134.3 PT; 294/93, 94; 403/50

[56] References Cited

U.S. PATENT DOCUMENTS

| | | |
|---|---|---|
| 151,482 | 6/1874 | Ferren . |
| 914,743 | 3/1909 | McDonald . |
| 986,297 | 3/1911 | Kinkade . |
| 1,616,392 | 3/1927 | Provost . |
| 2,466,974 | 4/1949 | Stupakoff et al. ................ 279/2 R |
| 2,667,139 | 1/1954 | Campbell . |
| 2,746,497 | 5/1956 | Thompson ................... 279/2 R X |
| 2,988,396 | 6/1961 | Davies ................................. 294/93 |
| 3,006,680 | 10/1961 | Gregory .............................. 294/93 |
| 3,038,754 | 6/1962 | Petersen ............................. 294/94 |
| 3,829,147 | 8/1974 | Ryswick .............................. 294/93 |
| 4,057,297 | 11/1977 | Pykälä ............................... 294/93 |

*Primary Examiner*—Frederick R. Schmidt
*Assistant Examiner*—Steven P. Schad
*Attorney, Agent, or Firm*—Emrich & Dithmar

[57] ABSTRACT

A tool inserted within a circular duct is adapted to securely engage the inner surface of the duct to facilitate drawing the duct through a conduit. The tool includes a screw inserted within a hollow tube-like member open at a first end and having a threaded inner surface along the length thereof for engaging the screw. A second, closed end of the tube-like member includes an expanded end portion. Positioned on the screw adjacent the first end of the tube-like member is a nut. Located along the length on the outside of the tube-like member are a plurality of alternately arranged rigid cylindrical spacers and compressible tubular sleeves. Displacement of the nut along the screw toward the hollow tube-like member causes the nut to abut and displace an immediately adjacent cylindrical spacer. Further rotation of the nut produces an abutting linear arrangement of the alternating cylindrical spacers and tubular sleeves causing the longitudinal compression of each of the tubular sleeves. In response to this longitudinal compression, the tubular sleeves expand radially outward and firmly engage the inner surface of the duct. The free end of the screw is provided with a link for attaching the tool to a cable for drawing the duct lengthwise through the conduit. After the duct is drawn through and positioned within the conduit, the rotation of the nut is reversed in relieving the compressive force upon the tubular sleeves permitting the tool to be easily removed from the duct.

11 Claims, 7 Drawing Figures

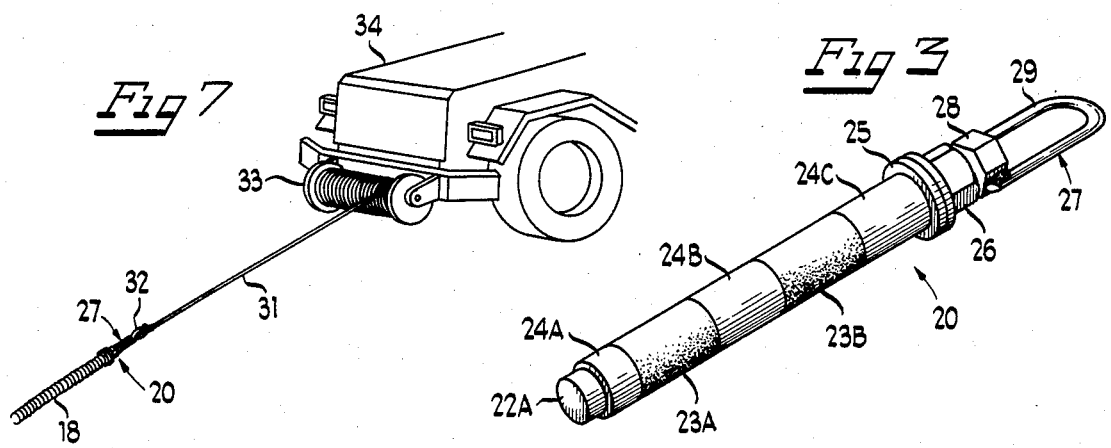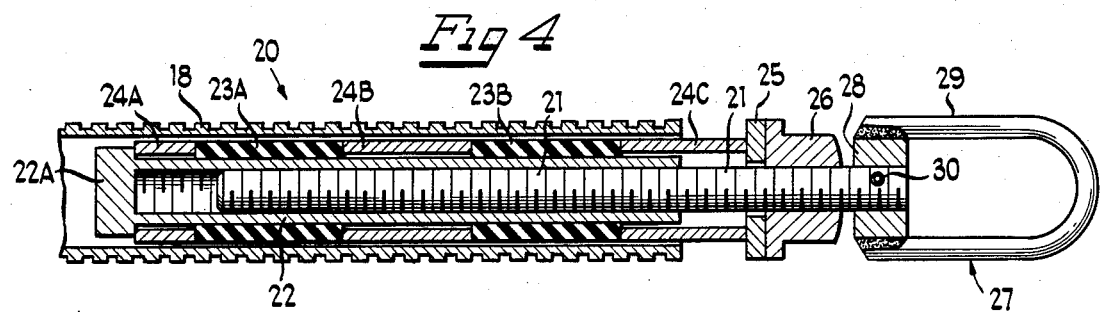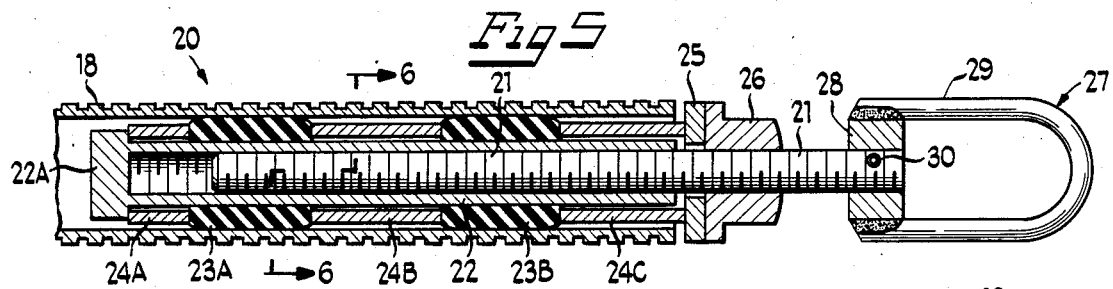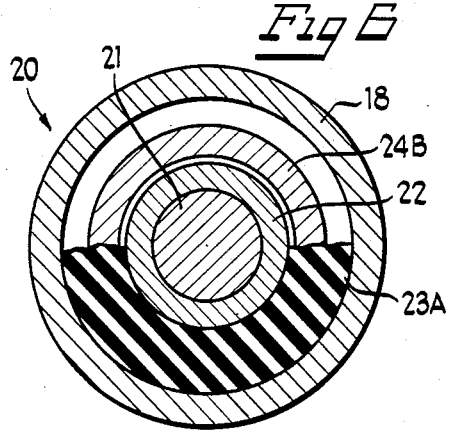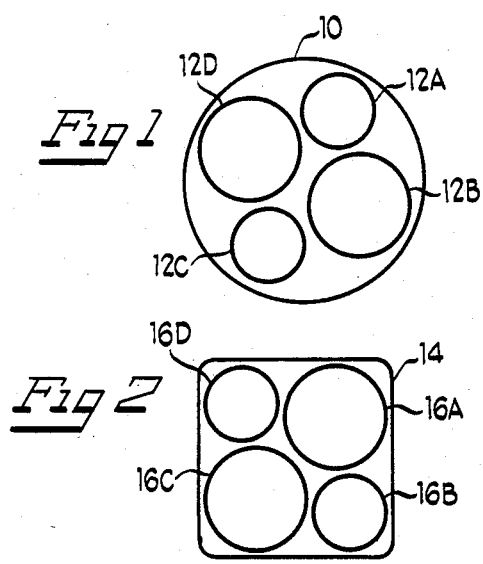

DUCT PULLING TOOL

BACKGROUND OF THE INVENTION

This invention relates generally to the positioning of a tubular duct in a conduit and is particularly directed to apparatus for engaging the inner surface of a duct to facilitate drawing it lengthwise through and positioning it within a conduit.

Electrical conductors located within a building structure or buried underground are generally positioned within a circular duct. Frequently many of these ducts are co-located within a single conduit. The ducts serve to isolate the electrical cables from one another in not only preventing the cables from contacting and rubbing against each other but also reducing the likelihood of electrical interference between adjacently positioned cables. Isolating cables positioned within a single conduit from one another is particularly important in the case of fiber optic cables which are being used on an ever increasing basis particularly in the field of telecommunications.

In general, a device is attached to one end of a duct to permit the duct to be pulled through the conduit for positioning the duct therein. Prior art duct pulling devices have suffered from various shortcomings. For example, currently available duct pulling devices provide only a limited engaging force with the duct being pulled and thus are generally limited to pulling relatively short lengths of duct. This, of course, increases the cost of laying the conduit because more frequent interruptions for pulling the duct and coupling adjacent lengths of conduit are required. In addition, prior art duct pulling devices have generally been larger in diameter than the duct being pulled and thus restrict the number of ducts which can be positioned within a given conduit to the cross sectional dimensions of the duct pulling device. This also increases the cost of installing electrical and communications lines. In addition, prior art duct pulling devices are of limited use with corrugated ducts which are finding increasing usage because of their flexibility. This is due to the reduced lateral engaging surface area of corrugated ducts which limits the pulling force of prior art pulling devices when used with this type of duct. Finally, prior art duct pulling devices are generally limited to use with ducts having a given cross sectional dimension.

The present invention is intended to overcome the aforementioned limitations of the prior art by providing a duct pulling tool capable of firmly engaging tubular ducts having a wide range of cross sectional dimensions for facilitating the positioning of the duct within and along the length of a conduit. The duct pulling tool of the present invention has an outer diameter less than that of the duct being pulled, is capable of securely engaging corrugated ducts, and permits a plurality of ducts to be pulled through a single conduit simultaneously.

SUMMARY OF THE INVENTION

Accordingly, it is an object of the present invention to facilitate the positioning of a tubular duct within a conduit.

It is another object of the present invention to permit several ducts to be simultaneously drawn through and positioned within and along the length of a conduit.

Still another object of the present invention is to facilitate the pulling of a tubular duct within a conduit without damaging the duct or distorting the conduit.

A further object of the present invention is to provide a tool for pulling a tubular duct through a conduit wherein the tool possesses a smaller diameter than the duct to facilitate its movement within and along the conduit.

A still further object of the present invention is to provide a more efficient arrangement for the laying of undergound cables positioned within conduit-encapsulated tubular ducts.

Yet another object of the present invention is to provide a duct pulling tool capable of pulling tubular ducts having a wide range of diameters through a conduit.

These and other objects of the invention are realized in an apparatus for pulling a duct through a conduit comprising elongated structural means, including first and second end portions, a movable member variably positioned on the structural means between the end portions, at least one compressible, resilient tubular sleeve encircling the structural means and located between the first end portion of the structural means and the movable member, the sleeve being longitudinally compressible so as to expand radially outwardly when the movable member is displaced toward the first end portion of the structural means to cause the sleeve to securely engage the inner surface of the duct, and coupling means attached to the second end portion of the structural means for coupling to a pull line.

The invention consists of certain novel features and a combination of parts hereinafter fully described, illustrated in the accompanying drawings, and particularly pointed out in the appended claims. It will be readily apparent to those skilled in the art that various changes in the details may be made without departing from the spirit or sacrificing any of the advantages of the present invention.

BRIEF DESCRIPTION OF THE DRAWINGS

For the purpose of facilitating an understanding of the invention, there is illustrated in the accompanying drawings, where like reference characters identify like elements throughout the various figures, a preferred embodiment of the invention, from an inspection of which, when considered in connection with the following description, the invention, its construction and operation, and many of its advantages will be readily understood and appreciated.

FIGS. 1 and 2 are cross-sectional views of a conduit having respectively a generally circular and generally square cross section in which are positioned a plurality of tubular ducts;

FIG. 3 is a perspective view of a duct pulling tool in accordance with the present invention;

FIGS. 4 and 5 are sectional views illustrating the duct pulling tool of FIG. 3 positioned within a tubular duct respectively showing the tool not engaging and engaging the surrounding duct;

FIG. 6 is a cross-sectional view of the duct pulling tool of FIG. 5 taken along sight line 6—6 therein; and FIG. 7 is a perspective view of a duct pulling tool engaging a tubular duct in accordance with the present invention and coupled to and drawn by a cable/winch system.

DETAILED DESCRIPTION OF THE PREFERRED EMBODIMENT

Referring to FIGS. 1 and 2, there are respectively shown cross-sectional views of a circular conduit 10 and a rectangular conduit 14 within which are positioned along the length thereof a plurality of tubular ducts. Positioned within generally circular conduit 10 are circular ducts 12A, 12B, 12C, and 12D. Similarly, positioned within the generally square conduit 14 of FIG. 2 are circular ducts 16A, 16B, 16C and 16D. Located within each of the circular ducts would typically be a conductor of either the electrical or optical type, although for simplicity sake these are not shown in the figures.

In accordance with the present invention, the duct pulling tool, shown in perspective view in FIG. 3, is inserted in an open end of a tubular duct and adjusted so as to be in secure engagement with an inner surface of the duct to permit the duct to be pulled, lengthwise through a conduit. With a duct pulling tool in accordance with the present invention positioned within each of a plurality of tubular ducts located within a given conduit, all of the ducts may be pulled simultaneously along the length of the conduit for proper positioning therein. Once the duct is properly positioned with the conduit, conventional cable pulling means may be used to draw a conductor through the duct and in this manner a conduit may be provided with a plurality of physically and electrically isolated conductors.

Referring to FIGS. 3, 4 and 6, there are shown various views of a duct pulling tool 20 in accordance with the present invention. The duct pulling tool 20 is shown in a perspective view in FIG. 3, in a sectional view in FIG. 4, and in a cross sectional view taken along sight line 6—6 of FIG. 5 in FIG. 6. Various features of the duct pulling tool discussed in the following paragraphs are shown in the various views in FIGS. 3, 4 and 6.

The duct pulling tool 20 includes a screw 21 having a threaded outer portion. The screw 21 is positioned within a first open end of a tube-like member 22 and extends therefrom. An inner surface of the tube-like member 22 extending substantially the entire length thereof is provided with threads for engaging the screw 21 positioned therein. A second end portion of the tube-like member 22 is provided with an expanded end portion 22A which is integral with and coupled to the elongated portion of the tube-like member. The expanded end portion 22A of the tube-like member 22 possesses a diameter greater than the outer diameter of the elongated portion of the tube-like member 22.

Positioned upon and threadably engaging the screw 21 is a movable member such as a nut 26. Positioned immediately adjacent to the nut 26 is a washer 25. Rotation of the nut 26 in a first direction will result in its displacement along the screw 21 toward the end portion 22A, while rotation in a second, opposite direction will result in its displacement away from the end portion 22A.

Positioned along the length of and around the tube-like member 22 is a plurality of rigid cylindrical spacers 24A, 24B and 24C. The first and third cylindrical spacers 24A, 24C are respectively positioned immediately adjacent to and in contact with the expanded end portion 22A of the tube-like member 22 and washer 25. The second cylindrical spacer 24B is positioned intermediate the first and third cylindrical spacers 24A, 24C. Positioned intermediate the first and second cylindrical spacers 24A and 24B is a tubular sleeve 23A. Between the second and third cylindrical spacers 24B, 24C is a tubular sleeve 23B. Displacement of the nut 26 along the screw 21 toward the tube-like member 22 will cause a corresponding displacement of the washer 25 and the third cylindrical spacer 24C. This, in turn, will result in close abutting contact between each of the tubular sleeves and the immediately adjacent cylindrical spacers. Further displacement of the nut 26 along the screw 21 will result in the longitudinal compression of each of the tubular sleeves 23A, 23B and their radial expansion outward toward the duct 18 within which the duct pulling tool 20 is positioned. Radial expansion of the tubular sleeves 23A, 23B will cause each of these sleeves to firmly engage a portion of the inner surface of the duct 18.

Referring specifically to FIG. 4, there is shown an arrangement in which the nut 26 is positioned along the screw 21 such that the washer 25 is merely in abutting contact with the third cylindrical spacer 24C. In the configuration of FIG. 4, neither of the tubular sleeves 23A, 23B is being compressed and therefore neither is radially expanded outwardly toward duct 18. In FIG. 5, however, the nut 26 has been moved leftward toward the tube-like member 22 so as to displace the washer 25 and the third cylindrical spacer 24C resulting in the longitudinal compression of the tubular sleeves 23A, 23B. The longitudinal compression of the tubular sleeves results in their radial expansion outward toward the duct 18, the inner surface of which is securely engaged by each of the tubular sleeves. Abutting contact between each of the tubular sleeves 23A, 23B and the inner surface of the duct 18 can be seen in FIGS. 5 and 6. In the case of a corrugated duct as shown in FIGS. 4 and 5, particularly good duct engagement is achieved because the outer surfaces of the two tubular sleeves 23A, 23B deform somewhat into the corrugations, so as to permit increased pulling forces to be exerted upon the duct. The inner surface of the duct 18 is not shown in FIGS. 4 and 5 as having a corrugated configuration, although the duct 18 could have such a corrugated inner surface. The present invention is compatible with either type of corrugated duct, with improved engagement realized between a duct having a corrugated inner surface and the duct pulling tool 20 of the present invention as described above.

Positioned on the free end of the screw 21 is a link assembly 27. The link assembly 27 includes a threaded sleeve 28 positioned on the free end of the screw 21 and maintained in position thereon by means of a set screw 30. Securely coupled to the threaded sleeve 28 such as by means of a weldment is a generally U-shaped link 29. The U-shaped link 29 of the link assembly 27 may be engaged by a cable for pulling the duct pulling tool 20 and the duct 18 which it engages through a conduit.

An arrangement for drawing the duct pulling tool 20 and the duct 18 through a conduit is shown in FIG. 7. The link assembly 27 is engaged by a cable loop 32 positioned on the end of a cable 31. The cable 31 is, in turn, positioned upon and displaced by a winch 33 which is shown mounted on the forward end of a vehicle 34. Rotation of the winch 33 results in the linear displacement of the combination of the cable 31 and the cable loop 32 for drawing the combination of the duct pulling tool 20 and the duct 18 toward the vehicle 34 and through a conduit which is not shown in FIG. 7 for simplicity sake.

There has thus been shown a duct pulling tool for drawing a tubular duct through a conduit. The duct pulling tool may be secured to a drawing cable at one end and at the other end thereof is adapted to securely engage the inner surface of the tubular duct and to permit the duct to be drawn through the conduit.

While particular embodiments of the present invention have been shown and described, it will be obvious to those skilled in the art that changes and modifications may be made without departing from the invention in its broader aspects. For example, while the duct pulling tool is disclosed in combination with a duct having a circular cross section, the present invention is not limited to use with only ducts having this configuration, but has application with any of the more conventional duct cross sectional shapes, e.g., square, rectangular, etc. In addition, while in a preferred embodiment the cylindrical spacers and tubular sleeves are respectively comprised of metal and rubber, various other materials well known to those skilled in the art could as easily be utilized. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for pulling a duct through a conduit, said apparatus comprising elongated structural means including first and second end portions, said structural means including a tubular member having a closed end defining said first end portion and an internally threaded open end, a stop means provided on said first end portion of said tubular member, and an elongated screw threadedly engaged in said open end of said tubular member; a nut threaded on said screw between said end portions; at least one compressible, resilient tubular sleeve encircling said tubular member and located between said stop means and said nut, said sleeve being longitudinally compressible so as to expand radially outwardly when said nut is displaced toward said first end portion of said structural means to cause said sleeve to securely engage the inner surface of said duct, and coupling means removably attached to said screw at the second end portion independently of said nut for coupling to a pull line.

2. The apparatus of claim 1, and further comprising first and second tubular spacer elements encircling said structural means and located adjacent to opposite ends of said tubular sleeve.

3. The apparatus of claim 2, wherein said tubular spacer elements are comprised of a rigid, noncompressible material.

4. The apparatus of claim 3, wherein said rigid, noncompressible material is metal.

5. The apparatus of claim 1, wherein each of said coupling means and said nut has a maximum cross sectional dimension which is no greater than that of the duct.

6. The apparatus of claim 1, and further comprising a washer positioned between said nut and said tubular sleeve.

7. The apparatus of claim 1, wherein said coupling means includes a threaded sleeve attached to a free end of said screw and a link attached to said threaded sleeve.

8. The apparatus of claim 1, wherein said duct and said structural means and said tubular sleeve are circular in transverse cross section.

9. The apparatus of claim 1, wherein said tubular sleeve is made of rubber.

10. Apparatus for pulling a duct through a conduit, said apparatus comprising elongated structural means including first and second end portions, said structural means including a tubular member having a closed end defining said first end portion and an internally threaded open end, a stop means provided on said first end portion of said tubular member, and an elongated screw threadedly engaged in said open end of said tubular member; a nut threaded on said screw between said end portions; a first plurality of tubular spacer elements and a second plurality of compressive, resilient tubular sleeves positioned in an alternating arrangement around said structural means along the length thereof between said stop means and said nut, said nut being movable toward said first end portion to cause said resilient tubular sleeves to be longitudinally compressed and undergo radially outward expansion so as to securely engage an inner surface of the duct; and coupling means removably mounted on the second end portion of said structural means independently of said nut for coupling to a pull line.

11. The apparatus of claim 10, wherein said alternating pluralities of tubular spacer elements and tubular sleeves abut the closed end of said tubular member and extend beyond the open end thereof.

* * * * *